Jan. 3, 1939. W. L. MARTIN 2,142,570

SUPPORT FOR HAIR DRIERS OR THE LIKE

Filed July 20, 1937

WENDELL L. MARTIN
INVENTOR

BY
ATTORNEY

Patented Jan. 3, 1939

2,142,570

UNITED STATES PATENT OFFICE 2,142,570

SUPPORT FOR HAIR DRIERS OR THE LIKE

Wendell L. Martin, Cleveland Heights, Ohio, assignor to The Martin Brothers Electric Company, Cleveland, Ohio, a corporation of Ohio Application July 20, 1937, Serial No. 154,623

3 Claims. (Cl. 248—162)

This invention relates broadly to supporting apparatus, but more particularly to a telescopic support used in connection with hair driers, fans or the like of the type that are adapted to rest on the floor.

The invention resides in the novel arrangement and combination of the supported means whereby simple manipulation of the parts affect the desired elevation of the supported device.

One object of this invention is to provide a support of this character with means for counterbalancing the weight of the device carried by the support, thereby facilitating its vertical adjustment.

Another object of this invention is to produce a telescopic support equipped with adequate sliding bearing means, whereby the telescopic movement may be effected without danger of scoring or otherwise marring the movable parts, permitting thereby the parts to be coated with a relatively inexpensive finish such as enamel paint or the like.

Another object of this invention is to produce a telescopic support adjustable in height with friction means for automatically maintaining the support in adjusted position.

Another object of this invention is to provide a support of this character with means enabling a relative rotation of the supported device irrespective of its vertical adjustment.

Another object of this invention is to produce a telescopic support which is simple in its construction, strong, durable, readily assembled, and comparatively inexpensive to manufacture.

Other objects of this invention will be apparent from the following detailed description wherein similar character of references designate corresponding parts and wherein.

Figure 1:
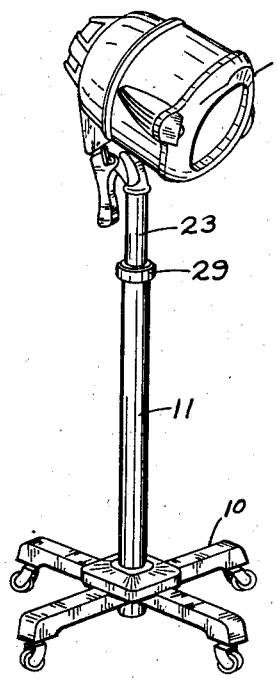
Fig. 1 is a perspective view of the device embodying the invention.

Referring to the drawing, 10 represents a base supporting a lower upright cylinder 11. Near its lower end, this cylinder is provided with an internal annular shoulder 12 forming a rest for a plate 13.

The upper end of the cylinder 11 is reinforced by a ring 14 disposed internally thereof and welded thereto to form an integral part of the cylinder. This ring has an external flange 15 extending over the upper end of the cylinder 11, and is formed with several, four in this instance, apertured ears 16.

Slidable within the cylinder 11, there is a sleeve 17 having its upper end enlarged as at 18 for engagement with the ring 14 to limit the upward movement of the sleeve, and forming a seat 19 on which rests one end of a compression spring 20 which is disposed in the cylinder 11 and carried by the plate 13. The lower end of the sleeve 17 is turned inwardly to receive a bearing plate 21 forming with the sleeve 17 a cup-shaped socket on the bottom of which rests the lower pointed end 22 of an upper cylinder 23, which cylinder is loosely mounted in the sleeve 17 and protrudes beyond the upper end of the lower cylinder. To reduce weight and manufacturing costs, the pointed end 22 is preferably made of sheet metal shaped as shown in the drawing and spot welded to the lower end of the upper tube 23.

Figure 4:
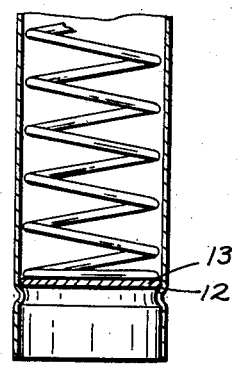
Fig. 4 is a plan view of one of the parts shown before it is assembled.

Secured to the upper end of the lower cylinder 11 by screws 24 extending through the apertured ears 16, there is a bearing assembly including two plates 25 and 26 which are preferably spot welded together as at 27, and have clamped between them a bearing member 28. The plate 26 is provided with a downwardly extending portion forming a shroud 29 covering the entire upper end of the cylinder 11, while the plate 25 is formed with an inturned flange 30 extending into the ring 14. The bearing member 28 is made of non-metallic material, and preferably of comparatively soft fibrous material such as felt. Before it is assembled the bearing is ring-shaped, having a plurality of radially disposed slits 31 extending part way from the interior to the exterior thereof as shown in Fig. 4.

To the upper end of the cylinder 23 may be secured the device intended to be carried by the support above described, which is illustrated herein to represent a hair drier 32.

In assembling the support, the plate 13 is first introduced in the lower tube 11 and made to rest on the shoulder 12. Subsequently the spring 20 and the sleeve or socket 17 are introduced in the lower tube and carried by the plate. Then the ring 14 is welded in position. After the bearing member 28 has been clamped between the plates 25 and 26, and the plates welded together as at 27, the bearing assembly is secured to the lower cylinder by the screws 24 with the bearing member extending horizontally across the end of the lower cylinder. The cylinder 23 is then introduced through the bearing member causing its slit portion to rest against the flange 30 and to assume substantially the position shown in Fig. 2. In thickness, the bearing member is somewhat greater than the distance between the flange 30 and the upper cylinder 23, causing thereby the bearing member to be actually compressed while in operative position, that is, between the flange 30 and the cylinder 23.

In the operation, the supported device or drier 32 may be lowered by exerting a comparatively slight pressure on the drier, thereby compressing the spring 20 and affording the downward telescopic movement of the upper cylinder 23 relative to the stationary cylinder 11. In practice, the tension of the spring 20 is calculated to slightly overcome or counterbalance the weight of the upper cylinder assembly, thus requiring but a slight pressure to effect the compression of the spring. When the pressure is removed the support will remain in its partly or totally contracted position due to the frictional resistance created by the felt 28 compressed between the flange 30 and the upper cylinder 23.

In practice, supports of the type described are usually used for carrying hair driers or the like which often are overhanging on one side of the support as shown in Fig. 1. In this instance the weight of the supported device will tend to cause, through the cylinder 23, a binding action of the sleeve enlarged end 18 with the stationary cylinder 11, thereby cooperating with the frictional resistance resulting from the compression of the felt bearing 28 for maintaining the support in adjusted position.

When it is desired to elevate the supported device, a slight lifting pressure is applied on the device to relieve the load carried by the spring 20, allowing thereby the expansion of the latter and the consequential upward movement of the sleeve 17 and cylinder 23.

Due to the point engagement of the upper cylinder 23 with the plate 21, it will be understood that the cylinder 23 is comparatively free to rotate, permitting thereby angular adjustment of the supported device.

Figures 2, 3:
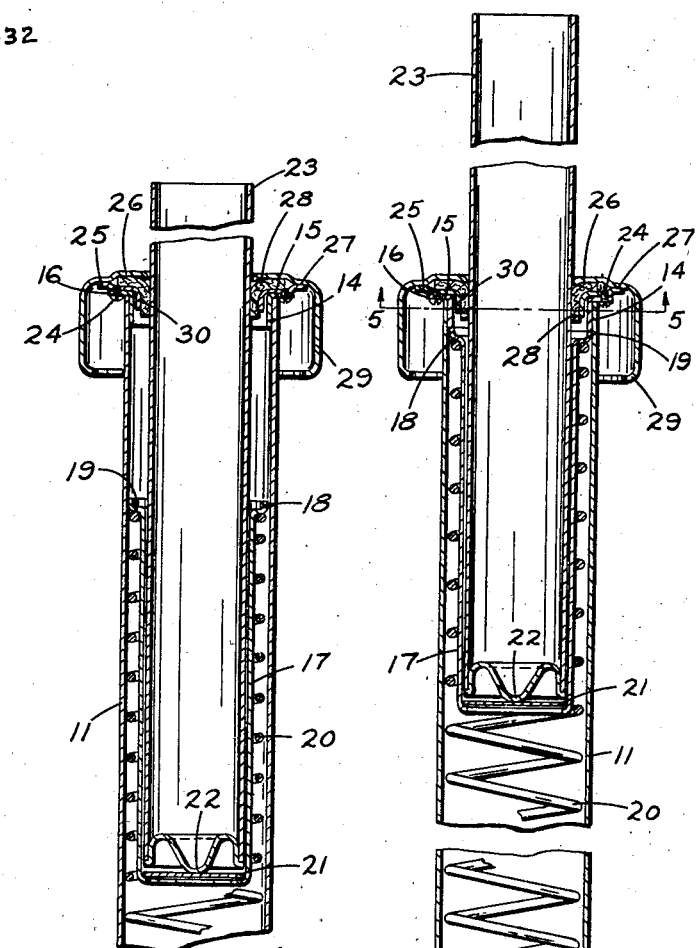
Fig. 2 is a vertical longitudinal sectional view of the support in extended position with the base and the head shown in Fig. 1 omitted.
Fig. 3 is a fragmentary view similar to Fig. 2, but showing the support in a partly contracted position.
Figure 5:
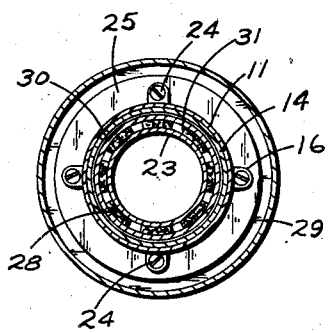
Fig. 5 is a cross sectional view taken in a plane indicated by line 5—5 in Fig. 2 and looking in the direction of the arrows.

From the foregoing description, it will be understood that vertical adjustment of the support is limited to a possible travel equal to the distance between the lower end of the sleeve 17 as shown in Fig. 2 and the plate 13. It will also be understood that due to the felt bearing between the telescopically mounted parts of the support, the cylinder 23 may be externally finished with relatively inexpensive coating such as paint or the like without danger of scarring or scratching such finish as would result from a metal to metal contact.

Although the foregoing description is necessarily of a detailed character in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. An adjustable support including two telescoping cylinders, a cup-shaped spring supported socket slidable within the outer cylinder, the inner cylinder being loosely carried by said socket for slidable movement therewith in point contact with the bottom thereof to enable free relative rotation therebetween, and friction means maintaining said cylinders against accidental telescopic movement including a resilient washer fastened on the upper end of the outer cylinder and extending downwardly between said cylinders in frictional engagement therewith.

2. An adjustable support including two telescoping cylinders, a sleeve slidable within the outer cylinder formed with an inturned end, a disk carried by said end, a pointed end for the inner cylinder resting on said disk for rotation relative to said sleeve, a compression spring supporting said sleeve normally urging said cylinders in extended position, and friction means maintaining said cylinders in any adjusted position possible by virtue of the slidable movement of said sleeve.

3. An adjustable support including a base, a tubular upright carried by said base formed with an open upper end, a sleeve slidable within said upright, an internal annular flange near the lower end of said sleeve, a disk carried by said flange closing the lower end of said sleeve, a tubular member within said sleeve extending through the open end of said upright and formed with a closed inner end, a point contact between said disk and inner end of said member enabling free relative rotation therebetween and slidable movement of said member with said sleeve, a supporting spring in operative engagement with said sleeve near the upper end thereof, and friction means maintaining said member in any adjusted position possible by virtue of said slidable movement.

WENDELL L. MARTIN.